Figure 1:
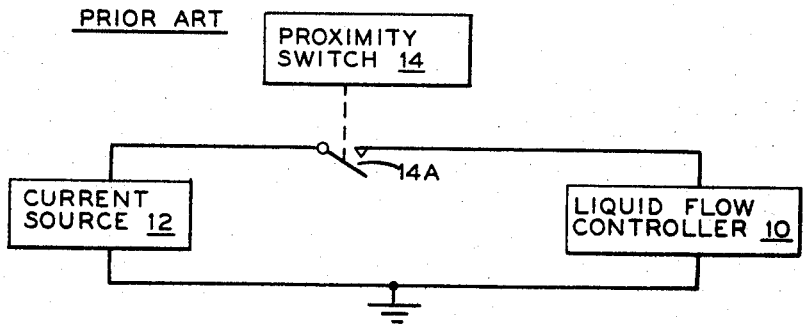

Nov. 19, 1968     N. A. FORBES     3,412,292
CONTROL RELAY CIRCUITS EMPLOYING PROXIMITY SWITCHES FOR
ENERGIZING LIQUID-FLOW CONTROLLERS
Filed May 12, 1966

INVENTOR.
Norman A. Forbes
BY
Eli Weiss
ATTORNEY

United States Patent Office 3,412,292
Patented Nov. 19, 1968

3,412,292
CONTROL RELAY CIRCUITS EMPLOYING PROXIMITY SWITCHES FOR ENERGIZING LIQUID-FLOW CONTROLLERS
Norman A. Forbes, Louisville, Ky., assignor to American Standard Inc., a corporation of Delaware
Filed May 12, 1966, Ser. No. 549,721
10 Claims. (Cl. 317—123)

This invention pertains to liquid-flow control systems which employ proximity switches to control liquid-flow controllers.

One of the chief uses of liquid-flow control systems is in plumbing such as lavatories, urinals, water closets, sinks and drinking fountains. Lately, proximity switches driving solenoid operated valves have been replacing manual controls. Basically, a proximity switch capacitive type (there are magnetic types as well, and these are used frequently for industrial handling, counting and sorting problems) is an electronic circuit which generates an electric current in response to the mere addition of a person's capacity to ground to an existing capacitor. Because of the number of components in the switch there is a fair possibility of one of the components failing. The failure of a component can result in the undesired operation of the valve. In other words, the proximity switch is not fail-safe.

It is, accordingly, a primary object of the invention to provide an improved liquid-flow control system which utilizes a proximity switch to control the operation of an electromechanical liquid-flow controller.

It is another object of the invention to provide an improved liquid-flow control system utilizing a proximity switch to control the operation of an electromechanical liquid-flow controller which is fail-safe.

Briefly, one aspect of the invention contemplates improvements in a liquid-flow control system wherein a proximity switch means which transmits an electric current when activated controls the operation of an electric current operated liquid-flow controller. The improvements for making the proximity switch means fail-safe includes an electric current operated switching means which is energized when receiving electric current from the proximity switch means. The switching means includes a first current-flow control circuit having an input and an output wherein electric current can flow from the input to the output only when the switching means is energized, and a second current-flow control circuit having an input and an output wherein electric current can flow from the input to the output only when the switching means is deenergized. A source of electric current is connected to the input of the first current-flow control circuit. A dischargeable electric energy storage means is connected to the output of the first current-flow control circuit and to the input of the second current-flow control circuit. An electric-current controlled source of electric current is connected to the output of the second current-flow control circuit for transferring electric current to the liquid-flow controller in response to electric current received from the electric current operated switching means.

Another aspect of the invention contemplates the use of two proximity switches, one to energize a fluid-flow controller, the other to turn it off. Circuitry connects the proximity switches to the controller in such a manner that the switches are fail-safe and immune to transient interference.

Other objects, features and advantages of the invention will be apparent from the following detailed description when read with the accompanying drawings which show, by way of example and not limitation, apparatus for practicing the invention.

Figure 2:
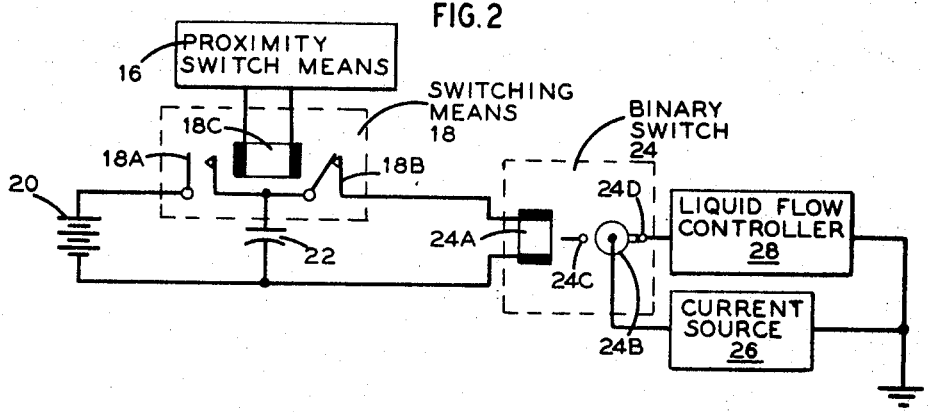
Figure 3:
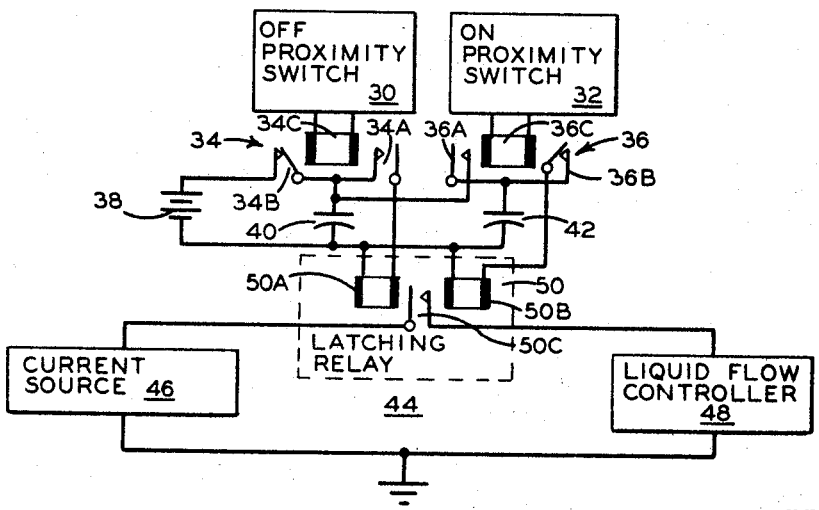

In the drawings:
FIG. 1 shows a block diagram of a prior art liquid-flow control system employing a proximity switch;
FIG. 2 shows a block diagram of fail-safe liquid-flow control system employing a proximity switch according to one aspect of the invention; and
FIG. 3 shows a block diagram of another fail-safe liquid-flow control system employing a pair of proximity switches, one to start liquid flow, the other to stop liquid flow.

Referring now to FIG. 1, a fluid-flow control system is shown comprising a liquid-flow controller 10 such as a solenoid operated water valve which receives operating current from electric current source 12, under control of proximity switch 14. Proximity switch 14 is of the type hereinabove described with its control function shown idealized as the contact set 14A. When proximity switch 14 is energized contact set 14A closes and current flows from current source 12 to liquid-flow controller 10. Liquid flow will continue only as long as switch 14 is energized. When proximity switch 14 is deenergized the contact set 14A opens. However, because of failure of electronic components in the proximity switch 14, the contact set 14A may be closed during the deenergization of switch 14. Such a system is not fail-safe.

Fail-safe operation of a proximity switch is shown in the fluid-flow control system of FIG. 2. In particular, electric current operated switching means 18 which is in the form of a relay whose coil 18C is connected to proximity switch means 16 and receives current therefrom when the latter is energized. The relay has a normally-open contact set 18A (a current-flow control circuit) and a normally-closed contact set 18B (a current-flow control circuit). One contact of set 18A (the input) is connected to one terminal of battery 20. The other contact of set 18A (the output) is connected to one terminal of capacitor 22 (a dischargeable electric energy storage means) which is also connected to one contact (the input) of set 18B. The other contact (the output) of set 18B is connected to the input of electric-current controlled source of electric current comprising a current source 26 which is controllably connected by binary switch 24 to liquid-flow controller 28. Binary switch 24 may be a two position rotary solenoid type switch having a coil 24A which mechanically drives a rotary wiper 24B alternately in contact with fixed contacts 24C and 24D. Wiper 24B is connected to current source 26 and contact 24D is connected to liquid-flow controller 28.

Assuming the rest or off condition when proximity switch means 16 is deenergized and wiper 24B is in contact with contact 24C of binary switch 24, then liquid-flow controller 28 is not energized and blocks the flow of liquid. When a user touches proximity switch means 16 it is energized transferring a current to the coil 18C of the relay. Contact set 18A closes and contact set 18B opens. Current flows from battery 20 via now closed contact set 18A to capacitor 22 which accumulates charge. When the user withdraws from proximity switch means 16 current stops flowing to coil 18C and the relay is deenergized. Contact set 18A opens and contact set 18B recloses. The charge accumulated by capacitor 22 flows as a pulse of current via contact set 18B to the coil 24A of binary switch 24 causing wiper 24B to move from contact 24C to contact 24D. Electric current now flows from current source 26 via wiper 24B and contact 24D to liquid-flow controller 28 which then permits fluid to flow. To stop the flow of fluid the user need only touch proximity switch means 16. The system operates as before except that the pulse of electric current now fed to coil 24A causes wiper 24B to move to contact 24C, interrupting the flow of electric current from current source 26 to liquid-flow controller 28.

There has been shown an improvement in a liquid-flow control system utilizing a proximity switch by providing for the accumulation of a quantum of electrical energy and then transferring this quantum as a pulse of current to operate a binary electric-current source. Thus the control of fluid flow requires a two-step operation whereas proximity switch component failure is equivalent to a single step. Hence, the system is fail-safe with respect to the proximity switch. Furthermore, such a system utilizes the same proximity switch for "on" and "off" control.

If there is a high probability of momentary or transient interference, it may be more desirable to utilize the system shown in FIG. 3. The system includes an off proximity switch 30 and an on proximity switch 32. The switches are like those described above but with off proximity switch 30 having a greater sensitivity than on proximity switch 32. Electric current operated switching means 34 which is preferably in the form of a relay whose coil 34C is connected to off proximity switch 30 and receives current therefrom when the latter is energized. The relay has a normally-open contact set 34A (a current-flow control circuit) and a normally-closed contact set 34B (a current-flow control circuit). Electric current operated switching means 36 which is in the form of a relay has a coil 36C which is connected to on proximity switch 32 and receives current therefrom when the latter is energized. The relay has a normally-open contact set 36A and a normally-closed contact set 36B (current-flow control circuits). One contact (input) of contact set 34B is connected to battery 38. The other contact (output) is connected to capacitor 40 (a dischargeable electric energy storage means) which is also connected to one contact (input) of contact set 34A. One contact (input) of contact set 36A is connected to the other contact of contact set 34B. The other contact (output) of contact set 36A is connected to capacitor 42 (a dischargeable electric energy storage means) which is also connected to one contact (input) of contact set 36B. The other contacts (outputs) of contact sets 34A and 36B are respectively connected to control inputs of a liquid-flow control means 44. Means 44 includes a current source 46 which transmits electric current to liquid-flow controller 48 (a solenoid operated valve, for example) under control of latching relay 50. Latching relay 50 is a bistable device and along with current source 46 can be considered as a bistable electric current source which feeds current to controller 48. Relay 50 may be of the type having two coils 50A and 50B and a contact set 50C. When coil 50A is energized contact set 50C opens and remains open until coil 50B is energized. When coil 50B is energized contact set 50C closes and remains closed until coil 50A is energized.

Assuming the system is in the off state, then the contact set 50C is open and liquid-flow controller 48 is blocked. When a person energizes (as actual touch is involved) proximity switch 32 relay 36 is energized and current flows from battery 38 via normally-closed contact set 34B and now closed contact set 36A to capacitor 42. Charge accumulates on capacitor 42. When the person withdraws from switch 32 relay 36 is deenergized and the charge on capacitor 42 passes as a pulse of current to coil 50B of relay 50. Contact set 50C thereof closes and current flows from current source 46 to controller 48 which opens allowing fluid to flow. Further touching of switch 32 at this time only sends additional current pulses to coil 50B. Since contact set 50C is now closed nothing further happens.

When it is desired to end fluid flow the user energizes proximity 30. Relay 34 is energized. However, it should be noted that before energization of relay 34 its normally-closed contacts 34B connected battery 38 to capacitor 40 which accumulated charge. This accumulated charge is transferred via contact set 34A as a current pulse to the coil 50A of relay 50 when relay 34 is energized. The current pulse through coil 50A causes contact set 50C to open, interrupting the flow of current from current source 46 to controller 48 which again blocks. Further energizing of proximity switch 30 at this time only causes additional current pulses to be fed to coil 50A but this has no effect since contact set 50C is open.

It should be noted that when the system is off a transient which would simultaneously energize both proximity switches leaves the system in the off state because of the greater sensitivity of switch 30. Switch 30 would energize first sending a current pulse to coil 50A and also contact set 34B would open before contact 36A closes so that current cannot reach capacitor 42.

Therefore, the system of FIG. 3 not only has the fail-safe advantages of the system of FIG. 2 but is also immune to transient disturbances because of the interlocking effect of the relays 34 and 36.

Obviously, many modifications and variations of the present invention are possible in the light of the above teachings. It is, therefore, to be understood that within the scope of the appended claims the invention may be practiced otherwise than as specifically described.

What is claimed is:

1. In a liquid-flow control system wherein a proximity switch means controls the operation of an electromechanical liquid-flow controller, the proximity switch transmitting an electric current when activated and the liquid-flow controller permitting the flow of liquid when receiving an electric current, the improvement comprising: a source of electric current; an electric current operated switching means connected to the proximity switch means and energized when receiving electric current therefrom, said switching means including a first current-flow control circuit having an input and an output wherein electric current can flow from said input to said output only when said switching means is energized and a second current-flow control circuit having an input and an output wherein electric current can flow from said input to said output only when said switching means is deenergized; means for connecting the input of said first current-flow control circuit to said source of electric current; a dischargeable electric energy storage means connected to the output of said first current-flow control circuit and to the input of said second current-flow control circuit; and an electric-current controlled source of electric current connected to the output of said second current-flow control circuit for transferring electric current to the liquid-flow controller in response to electric current received from said electric current operated switching means.

2. The liquid-flow control system of claim 1 wherein the output of said second current-flow control circuit transmits a pulse of electric current in response to the deactivation of the proximity switch means after the activation thereof and wherein said electric-current controlled source of electric current binarily switches between states of electric current transfer and non-transfer in response to the receipt of pulses of electric current.

3. The liquid flow control system of claim 2 wherein said electric current operated switching means is a relay having a coil connected to the proximity switch means, a normally-open contact set which is said first current-flow control circuit and a normally-closed contact set which is said second current-flow control circuit.

4. The liquid-flow control system of claim 3 wherein said dischargeable electric energy storage means is a capacitor.

5. A liquid-flow control system comprising: an on proximity switch for controlling the starting of liquid flow; an off proximity switch for controlling the stopping of liquid flow; each of said proximity switches transmitting an electric current when energized; a source of electric current; a first electric current operated switching means connected to said off proximity switch and energized when receiving electric current therefrom, said switching means including a first current-flow control circuit having an input and an output wherein electric current can flow from said input to said output only when said switching means is energized and a second current-flow control circuit having an input and an output wherein electric current can flow from said input to said output only when said switching means is deenergized; means for connecting the input of said second current-flow control circuit to said source of electric current; a first dischargeable electric energy storage means connected to the output of said second current-flow control circuit and the input of said first current-flow control circuit; a second electric current operated switching means connected to said on proximity switch and energized when receiving electric current therefrom, said switching means including a first current-flow control circuit having an input and an output wherein electric current can flow from said input to said output only when said switching means is energized and a second current-flow control circuit having an input and an output wherein electric current can flow from said input to said output only when said switching means is deenergized; means for connecting the input of the first current-flow control circuit of said second electric current operated switching means to the output of the second current-flow control circuit of said first electric current operated switching means; a second dischargeable electric energy storage means connected to the output of the first current-flow control circuit and the input of the second current-flow control circuit of said second electric current operated switching means; and a bistable electric current controlled liquid-flow control means having a first control input connected to the output of the first current-flow control circuit of said first electric current operated switching means to cause liquid to flow and a second control input connected to the output of the second current-flow control circuit of said second electric current operated switching means to stop the flow of liquid.

6. The liquid-flow control system of claim 5 wherein: said first electric current operated switching means is a relay having a coil connected to said off proximity switch, a normally-open contact set which is the first current-flow control circuit thereof and a normally-closed contact set which is the second current-flow control circuit thereof; and said second electric current operated switching means is a relay having a coil connected to said on proximity switch, a normally-open contact set which is the first current-flow control circuit thereof and a normally-closed contact set which is the second current-flow control circuit thereof.

7. The liquid-flow control system of claim 6 wherein said first and second dischargeable electric energy storage means are capacitors.

8. The liquid flow control system of claim 5 wherein said bistable electric-current controlled liquid-flow control means includes a bistable source of electric current having first and second inputs and which transmits an electric current upon receipt of an electric current pulse at its second input and stops transmitting the electric current upon receipt of an electric current pulse at its first input, and an electric-current operated liquid valving means connected to said bistable source of electric current.

9. The liquid-flow control system of claim 8 wherein said bistable source of electric current is an electric current source and a latching relay having a contact set for serially connecting said electric current operated liquid valving means.

10. The liquid-flow control system of claim 9 wherein: said first electric current operated switching means is a relay having a coil connected to said off proximity switch, a normally-open contact set which is the first current-flow control circuit thereof and a normally-closed contact set which is the second current-flow control circuit thereof; said second electric current operated switching means is a relay having a coil connected to said on proximity switch, a normally-open contact set which is the first current-flow control circuit thereof and a normally-closed contact set which is the second current-flow control circuit thereof; and said first and second dischargeable electric energy storage means are capacitors.

References Cited

UNITED STATES PATENTS

| | | | |
|---|---|---|---|
| 3,032,270 | 5/1962 | Corbin | 320—1 XR |
| 3,134,986 | 6/1964 | Gelhar | 4—249 |
| 3,210,658 | 8/1965 | Reynolds | 317—151 |
| 3,234,408 | 2/1966 | Camnitz | 320—1 XR |
| 3,314,081 | 4/1967 | Atkins et al. | 4—249 XR |
| 3,341,746 | 9/1967 | Baker et al. | 317—137 XR |

JOHN F. COUCH, *Primary Examiner.*

W. M. SHOOP, *Assistant Examiner.*